S. E. GREEN.
TOOL HOLDER.
APPLICATION FILED NOV. 20, 1912.
1,075,253.
Patented Oct. 7, 1913.
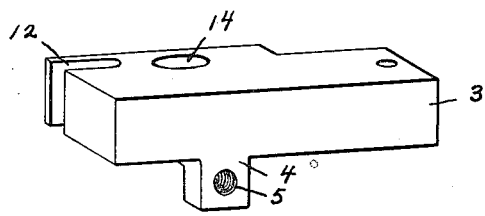
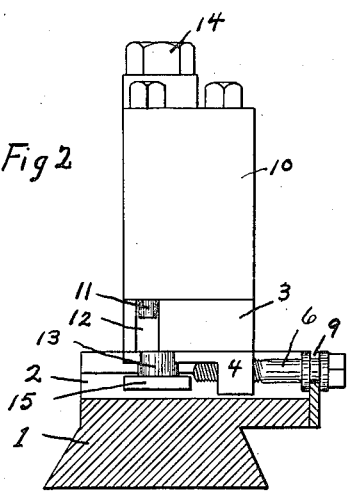
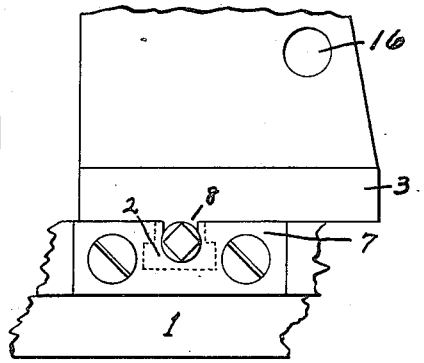
Witnesses:
Rose Solomon.
David A. Wilson
Inventor:
Sven E. Green.
Per Geo. B. Ward.
Attorney.

UNITED STATES PATENT OFFICE.

SVEN E. GREEN, OF BRISTOL, CONNECTICUT.

TOOL-HOLDER.

1,075,253.

Specification of Letters Patent.     Patented Oct. 7, 1913.

Application filed November 20, 1912. Serial No. 732,579.

*To all whom it may concern:*

Be it known that I, SVEN E. GREEN, citizen of the United States, residing at Bristol, in the county of Hartford and State of Connecticut, have invented certain new and useful Improvements in Tool-Holders, of which the following is a specification.

One object of the invention is to provide means for positively adjusting a tool holder so that the tool holder thereby may be arranged in accurate position.

A further object of the invention is to provide positive means for both adjusting and locking the tool holder.

To these ends and also to improve generally upon devices of the class specified the invention consists in the matters hereinafter described and claimed.

Figure —1— is a perspective view of the tool holder base. Fig. —2— is an elevation partially in cross section of the invention. Fig. —3— is a lateral view of Fig. —2— partially cut away.

Referring to the drawings as the illustrated embodiment of the invention, —1— is a longitudinally movable member having a transverse slot as at —2— therein. The said slot preferably has an enlargement at the bottom thereof extending across said movable member —1—. A tool holder base —3— is mounted on said longitudinally movable member —1— and has a lug —4— adapted to travel transversely to said longitudinally movable member in said slot —2—. The lug —4— is preferably pierced as at —5— and threaded to receive the threaded end of a bolt —6— preferably secured to said movable member —1— by means of a plate —7— which is slotted as at —8— to engage an annular groove —9— in the bolt —6—. It will thus be seen that by turning said bolt —6— in either direction the base —3— and the tool holder —10— may be adjusted laterally as desired. The tool holder —10— preferably is loosely mounted on said tool holder base —3— and may be moved slightly on said base —3— by means of an eccentric bolt —11— in engagement with an opening —12— in said base.

To secure said tool holder and said tool holder base in the desired position I provide the following locking means: An upright shank —13— extends through an aperture as at —14— in said base and through said tool holder —10— so that it may be tightened up or loosened by means of a nut —14—. The lower end of said shank has an enlarged head —15— which travels laterally in the enlarged bottom portion of the slot —2— when the tool holder is given the lateral adjustment. As the head —15— and the lug —4— are preferably a fixed distance from each other and are preferably arranged snugly in the said slot —2—, when adjusting the device steadiness and accuracy may be accomplished thereby. The head —15— is preferably square and when the nut —14— is tightened up it comes into positive engagement with the sides of the transverse slot —2— and when the nut —14— is set both the tool holder —10— and the base —3— are positively held in position thereby.

A tool may be held by said tool holder in any manner desired but preferably I provide an opening —16— therein to hold any such tool.

What I claim is—

1. In a device of the class specified a longitudinally movable member having a transverse slot, a tool holder base mounted thereon having a lug adapted to travel in said slot, said lug being in threaded engagement with a bolt secured to said longitudinally movable member, whereby said tool holder base is moved laterally as desired and an upright locking member extending from said slot through said tool holder base having its head traveling in said slot.

2. In a device of the class specified a longitudinally movable member having a transverse slot enlarged at the bottom thereof, a tool holder base mounted thereon having a lug adapted to travel in said slot, said lug being in threaded engagement with a bolt secured to a plate on said longitudinally movable member, whereby said tool holder base is moved laterally as desired and an upright locking member extending from said slot through said tool holder base having its head traveling in said slot with said lug.

3. In a device of the class specified a longitudinally movable member having a transverse slot, a tool holder base mounted thereverse slot, a tool holder base mounted thereon having a lug traveling in said slot, means for transversely moving said base on said slot and a locking member having its head traveling in said slot.

4. In a device of the class specified a longitudinally movable member having a transverse slot, a tool holder base mounted thereon having a lug traveling in said slot, means for transversely moving said base on said slot and a locking member having its head traveling continually at a pre-determined distance from said lug in said slot.

In testimony whereof I affix my signature in presence of two witnesses.

SVEN E. GREEN.

Witnesses:
 GEO. B. WARD,
 C. V. MASON.

Copies of this patent may be obtained for five cents each, by addressing the "Commissioner of Patents, Washington, D. C."